United States Patent
Van Hove et al.

(10) Patent No.: US 9,517,876 B2
(45) Date of Patent: *Dec. 13, 2016

(54) INTEGRALLY BLOW-MOULDED BAG-IN-CONTAINER HAVING AN INNER LAYER AND THE OUTER LAYER MADE OF THE SAME MATERIAL AND PREFORM FOR MAKING IT

(71) Applicant: Anheuser-Busch InBev S.A., Brussels (BE)

(72) Inventors: Sarah Van Hove, Boutersem (BE); Daniel Peirsman, Bornem (BE); Rudi Verpoorten, Lommel (BE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,610

(22) Filed: Feb. 23, 2016

(65) Prior Publication Data

US 2016/0185505 A1  Jun. 30, 2016

Related U.S. Application Data

(63) Continuation of application No. 12/450,895, filed as application No. PCT/EP2008/054770 on Apr. 18, (Continued)

(51) Int. Cl.
  *B65D 83/00* (2006.01)
  *B65D 25/16* (2006.01)
  (Continued)

(52) U.S. Cl.
  CPC ............ *B65D 83/0055* (2013.01); *B29B 11/14* (2013.01); *B29C 45/0053* (2013.01); *B29C 45/16* (2013.01);
  (Continued)

(58) Field of Classification Search
  CPC ....... B65D 23/02; B65D 1/02; Y10T 29/53335; Y10T 428/1352; Y10T 428/1355; Y10T 428/1359; B05B 11/0043; B29B 11/04; B29C 49/22; B29L 2031/7158
  (Continued)

(56) References Cited

U.S. PATENT DOCUMENTS

| 3,450,254 A | 6/1969 | Miles |
| 3,484,011 A | 12/1969 | Greenhaigh et al. |

(Continued)

FOREIGN PATENT DOCUMENTS

| EP | 1 245 499 | 10/2002 |
| EP | 1356915 | 10/2003 |

(Continued)

OTHER PUBLICATIONS

Wiley, John & Sons, "Processing and finishing of Polymeric Materials," vol. 2, p. 221 (2011) ISBN 978-0-470-88917-6.

(Continued)

*Primary Examiner* — Lee Sanderson
(74) *Attorney, Agent, or Firm* — Levy & Grandinetti

(57) ABSTRACT

The present invention relates to an integrally blow-molded bag-in-container (2) having an integrally blow-molded bag-in-container wherein the same polymer is in contact on either side of the interface between the inner (11) and outer layers (12). It also concerns a preform (1, 1') for blow-molding a bag-in-container, having an inner layer and an outer layer, wherein the preform forms a two-layer container upon blow-molding, and wherein the thus obtained inner layer of the container releases from the thus obtained outer layer upon introduction of a gas at a point of interface between the two layers. The inner and outer layers are of the same material.

5 Claims, 2 Drawing Sheets

Related U.S. Application Data 2008, which is a continuation-in-part of application No. 11/785,746, filed on Apr. 19, 2007, now abandoned.

(51) Int. Cl.

| | | |
|---|---|---|
| *B29C 49/06* | (2006.01) | |
| *B29C 49/22* | (2006.01) | |
| *B29B 11/14* | (2006.01) | |
| *B29C 45/00* | (2006.01) | |
| *B29C 45/16* | (2006.01) | |
| *B65D 23/02* | (2006.01) | |
| B29K 23/00 | (2006.01) | |
| B29K 67/00 | (2006.01) | |
| B29K 77/00 | (2006.01) | |
| B29K 105/00 | (2006.01) | |
| B29K 101/12 | (2006.01) | |
| B29L 31/00 | (2006.01) | |

(52) U.S. Cl.
CPC ............ *B29C 49/06* (2013.01); *B29C 49/221* (2013.01); *B65D 23/02* (2013.01); *B65D 25/16* (2013.01); *B29B 2911/1408* (2013.01); *B29B 2911/1414* (2013.01); *B29B 2911/1444* (2013.01); *B29B 2911/14053* (2013.01); *B29B 2911/14066* (2013.01); *B29B 2911/14093* (2013.01); *B29B 2911/14113* (2013.01); *B29B 2911/14326* (2013.01); *B29B 2911/14333* (2013.01); *B29C 45/1684* (2013.01); *B29C 2045/1601* (2013.01); *B29K 2023/06* (2013.01); *B29K 2023/065* (2013.01); *B29K 2023/086* (2013.01); *B29K 2023/12* (2013.01); *B29K 2067/003* (2013.01); *B29K 2067/043* (2013.01); *B29K 2067/046* (2013.01); *B29K 2077/00* (2013.01); *B29K 2101/12* (2013.01); *B29K 2105/253* (2013.01); *B29K 2105/258* (2013.01); *B29K 2667/043* (2013.01); *B29L 2031/712* (2013.01); *Y10T 428/1352* (2015.01)

(58) Field of Classification Search
USPC ........ 215/12.1, 12.2, 385, 902; 222/94, 105, 222/107, 386.5, 495.06; 428/35.7, 36.91, 428/542.8; 220/FOR. 173
See application file for complete search history.

(56) References Cited

U.S. PATENT DOCUMENTS

| | | |
|---|---|---|
| 4,147,278 A | 4/1979 | Uhlig |
| 4,233,010 A | 11/1980 | Suzuki |
| 4,243,725 A | 1/1981 | Wiggins et al. |
| 4,330,066 A | 5/1982 | Berliner |
| 4,339,502 A | 7/1982 | Gerry et al. |
| 4,459,400 A | 7/1984 | Kuhfuss et al. |
| 4,609,516 A | 9/1986 | Krishnakumar et al. |
| 4,863,665 A | 9/1989 | Schad et al. |
| 4,892,230 A | 1/1990 | Lynn, Jr. |
| 5,242,085 A * | 9/1993 | Richter .............. B65D 1/0215 215/12.1 |
| 5,301,838 A | 4/1994 | Schmidt et al. |
| 5,332,121 A | 7/1994 | Schmidt et al. |
| 5,344,045 A | 9/1994 | Richter et al. |
| 5,407,629 A | 4/1995 | Schmidt et al. |
| 5,435,452 A * | 7/1995 | Nishigami .......... B05B 11/0043 215/12.1 |
| 5,921,416 A | 7/1999 | Uehara |
| 6,238,201 B1 | 5/2001 | Safian |
| 6,649,121 B1 | 11/2003 | Hamamoto et al. |
| 7,820,257 B2 | 10/2010 | Shi et al. |
| 2002/0022140 A1 | 2/2002 | Semersky |
| 2004/0060889 A1* | 4/2004 | Yoneyama .......... B65D 1/0215 215/12.1 |
| 2005/0103802 A1 | 5/2005 | Alberg |
| 2008/0257846 A1 | 10/2008 | Van Hove et al. |
| 2008/0257847 A1 | 10/2008 | Van Hove et al. |
| 2008/0258356 A1 | 10/2008 | Van Hove et al. |
| 2008/0260978 A1 | 10/2008 | Van Hove et al. |
| 2009/0057347 A1 | 3/2009 | Leys et al. |
| 2009/0206524 A1 | 8/2009 | Laidler et al. |

FOREIGN PATENT DOCUMENTS

| | | | |
|---|---|---|---|
| EP | 1 593 605 | 11/2005 | |
| FR | 2138685 | 1/1973 | |
| GB | WO 9108099 A1 * | 6/1991 | ............ B29B 11/14 |
| JP | 05-213373 | 8/1993 | |
| JP | 06-039906 | 2/1994 | |
| JP | 08-001761 | 1/1996 | |
| JP | 09-208688 | 8/1997 | |
| JP | 10-128833 | 5/1998 | |
| JP | 10-180853 | 7/1998 | |
| JP | 10180853 A * | 7/1998 | |
| JP | 11-010719 | 1/1999 | |
| JP | 2000 062745 | 2/2000 | |
| JP | 2005047172 | 2/2005 | |
| WO | WO 91/08099 | 6/1991 | |
| WO | WO 2006124199 | 11/2006 | |

OTHER PUBLICATIONS

Sánchez-Valdes, S. et al., Polymer Engineering and Science, Jan. 1998, No. 1, 150-55.
Du Q. et al., Polymer Engineering and Science, 2010, 1111-21.
Clive, Maier and Theresa Calafut, Polypropylene: The Definitive User's Guide and Databook, Plastics Design Library 1998, ISBN 1-884207-58-8, pp. 194-198.
Leaversuch, R.,"Barrier PET Bottles," Plastics Technology, Mar. 2003, web: http://www.ptonline.com/articles/barrier-pet-bottles.
Connor, M. et al., "A criterion for optimum adhesion applied to fibre reinforced composites," 32 Journal of Material Science 5059-67 (1997).

\* cited by examiner

INTEGRALLY BLOW-MOULDED BAG-IN-CONTAINER HAVING AN INNER LAYER AND THE OUTER LAYER MADE OF THE SAME MATERIAL AND PREFORM FOR MAKING IT

CROSS REFERENCE TO RELATED APPLICATIONS

This application is a continuation application of U.S. application Ser. No. 12/450,895, filed on Oct. 16, 2009, which was a 35 U.S.C. §371 national phase of PCT/EP2008/054770, filed on Apr. 18, 2008, which was a continuation-in-part of U.S. application Ser. No. 11/785,746, filed on Apr. 19, 2007.

FIELD OF THE INVENTION

The present invention relates in general to new developments in dispensing bag-in-containers and, in particular, to integrally blow-moulded bag-in-containers made of a single material. It also relates to a method for producing said bag-in-containers and, in particular, to preforms used for their production, as well as a method for producing said preform.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were and still are produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. No. 3,484,011, U.S. Pat. No. 3,450,254, U.S. Pat. No. 4,330,066, and U.S. Pat. No. 4,892,230. These types of bag-in-containers have the advantage of being reusable, but they are very expensive and labour-intensive to produce.

More recent developments focused on the production of "integrally blow-moulded bag-in-containers" thus avoiding the labour intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges, and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121). When the former method is advantageous in terms of productivity, the latter is preferable when wall thickness accuracy is required, typically in containers for dispensing beverage.

The formation of the vents fluidly connecting the space or interface between bag and bottle to the atmosphere remains a critical step in integrally blow-moulded bag-in-containers and several solutions were proposed in, e.g., U.S. Pat. No. 5,301,838, U.S. Pat. No. 5,407,629, JPA5213373, JPA8001761, EPA1356915, U.S. Pat. No. 6,649,121, JPA10180853.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production of co-layered containers (cf. EPA1356915).

One redundant problem with integrally blow-moulded bag-in-containers is the choice of materials for the inner and outer layers which must be selected according to strict criteria of compatibility in terms of processing on the one hand and, on the other hand, of incompatibility in terms of adhesion. These criteria are sometimes difficult to fulfill in combination as illustrated below.

Addressing processing compatibility, EPA1356915 and U.S. Pat. No. 6,649,121 proposed that the melting temperature of the outer layer should be higher than the one of the inner layer in order to allow production of integral preforms by injection moulding the outer layer thereof, followed by injecting thereover the inner layer. Examples of materials for the outer layer given by the authors include PET and EVOH, whilst polyethylene is given as an example for the inner layer. Though this materials selection could be advantageous for the injection moulding production of the preforms, it is far from optimal for the blow-moulding step since polyethylene and PET are characterized by different blow-moulding temperatures. Again, in U.S. Pat. No. 6,238,201 a method is described including coextruding a two layer parison followed by blow-moulding the parison into a bag-in-container wherein the outer layer preferably comprised an olefin and the inner layer an amorphous polyamide.

Concerning the materials choice for a weak interfacial adhesion required for ensuring proper delamination of the inner layer from the outer layer upon use, mention is made in JP2005047172 of "mutually non-adhesive synthetic resins." In the review of the background art in U.S. Pat. No. 5,921,416 the use of release layers interleafed between inner and outer layers, forming three- or five-layer structures is mentioned. An example of such construction is described in U.S. Pat. No. 5,301,838 which discloses a complex five layer preform comprising three PET layers interleafed by two thin layers of a material selected from the group of EVOH, PP, PE, PA6. Here again, beside the complexity involved with the production of such preforms, substantial differences in blow-moulding temperatures characterize these different materials. Last but not least, the use of different materials renders recycling of such bag-in-containers problematic as the bag cannot be removed easily from the container after use.

It follows from the foregoing that there remains a need in the field of integrally blow-moulded bag-in-containers, with respect to the choice of materials for the inner and outer layers as well as for recyclability of the bag-in-containers after use.

SUMMARY OF THE INVENTION

The present invention is defined in the appended independent claims. Preferred embodiments are defined in the dependent claims. In particular the present invention relates to an integrally blow-moulded bag-in-container wherein the same polymer is in contact on either side of the interface between the inner and outer layers.

It also concerns a preform for blow-moulding a bag-in-container, having an inner layer and an outer layer, wherein the preform forms a two-layer container upon blow-moulding, and wherein the thus obtained inner layer of the container releases from the thus obtained outer layer upon introduction of a gas at a point of interface between the two layers. The inner and outer layers are the same material.

A preferred embodiment the preform according to the present invention is an assembly having a first preform for the inner layer, and a second preform for the outer layer such that the first preform fits into the second preform.

In an alternative embodiment, the preform is an integral preform obtained by injection moulding one layer over the other.

DETAILED DESCRIPTION OF THE INVENTION

Figures 1A, 2A:
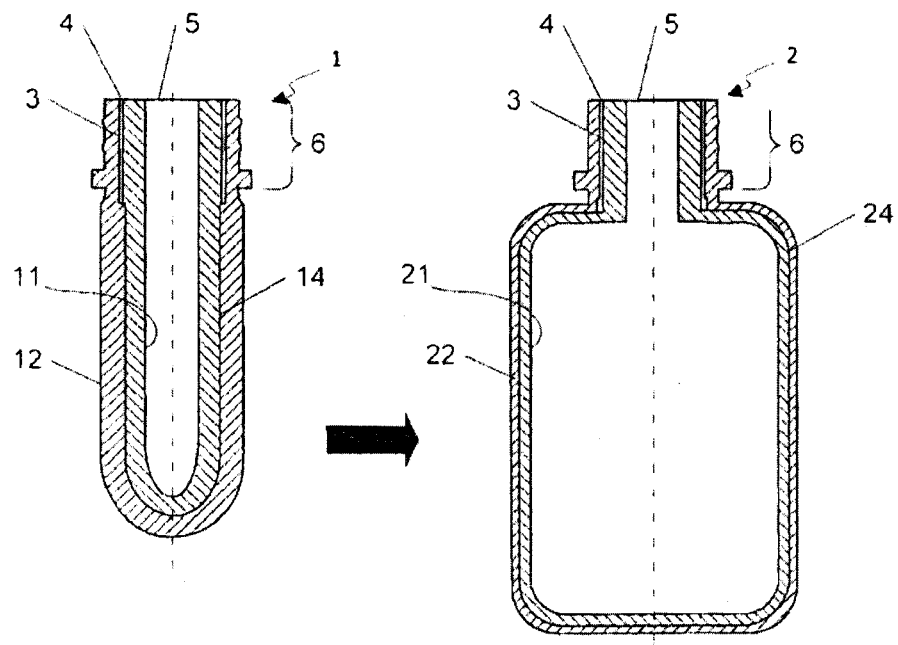
FIG. 1A is a schematic cross-sectional representation of a first embodiment of a two layer preform suitable for blow-moulding a container according to the present invention.
FIG. 2A is schematic cross-section representation of a container according to the present invention obtained by blowmoulding the preform of FIG. 1A.
Figures 1B, 2B:
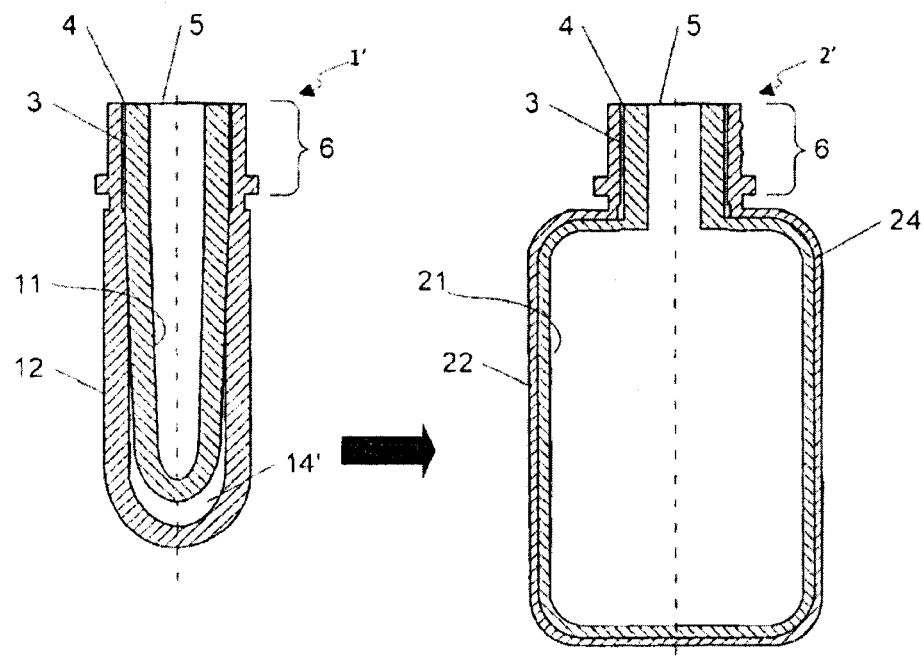
FIG. 1B is a schematic cross-sectional representation of a second embodiment of a two layer preform suitable for blowmoulding a container according to the present invention.
FIG. 2B is schematic cross-sectional representation of a container according to the present invention obtained by blowmoulding the preform of FIG. 2B.

Referring now to appended FIGS. 1A, 2A and 1B, 2B, there is illustrated an integrally blow-moulded bag-in-container (2) and a preform (1)&(1') for its manufacturing. The preform (1) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3) opening to the atmosphere in (4).

Figure 3:
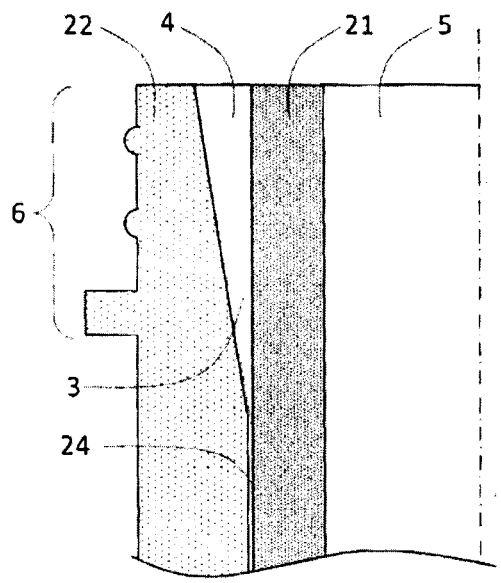
FIG. 3 is a cross-sectional view of a vent in the shape of a wedge.
Figure 4:
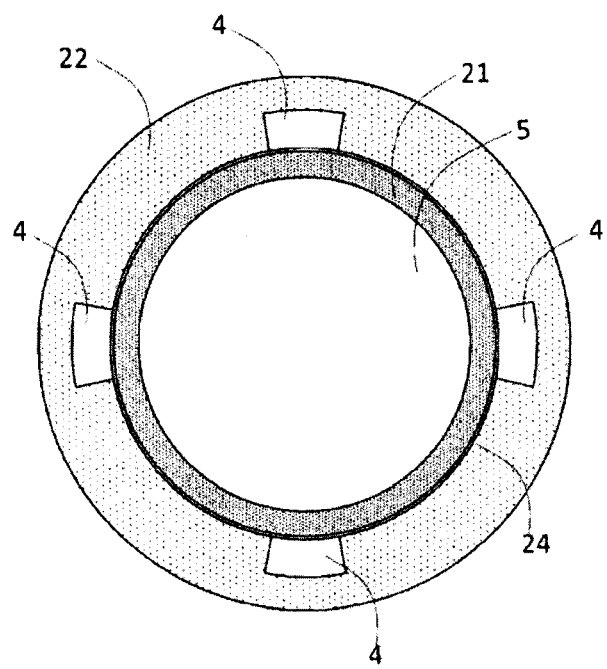
FIG. 4 is a top view of the mouth region of a container comprising more than one vent distributed around the lip of the bag-in-container's mouth.

Many vent geometries have been disclosed and it is not critical which geometry is selected. It is preferred, however, that the vent be located adjacent to, and oriented coaxially with said preform's mouth (5) as illustrated in FIG. 1. More preferably, and as illustrated in FIG. 3, the vents have the shape of a wedge with the broad side at the level of the opening (4) thereof and getting thinner as it penetrates deeper into the vessel, until the two layers meet to form an interface (14) at least at the level of the neck region. This geometry allows for a more efficient and reproducible delamination of the inner bag upon use of the bag-in-container. The container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, and as illustrated in FIG. 4, the preform comprises two vents opening at the vessel's mouth lip at diametrically opposed positions. More preferably, three, and most preferably, at least four vents open at regular intervals of the mouth lip.

The preform may consist of an assembly of two separate preforms (11) and (12) produced independently from one another and thereafter assembled such that the inner preform (11) fits into the outer preform (12). This solution allows for greater freedom in the design of the neck and vents. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted by this process.

When intuition suggests, and all the prior art teaches to use "[different and] mutually nonadhesive synthetic resins" for the inner and outer layers of a preform for making a bag-in-container (cf. JPA2005047172), it has surprisingly been discovered that excellent delamination results between the inner and outer layers can be obtained also with preforms wherein both inner and outer layers consist of the same material. Similar results were obtained both with preform assemblies as well as with integral preforms. In the case of integral, over-moulded preforms, it is generally believed that better results are obtained with semi-crystalline polymers.

Preferred materials for the layers of the preform and bag-in-container of the present invention are polyesters like PET, PEN, PTT, PTN; polyamides like PA6, PA66, PA11, PA12; polyolefins like PE, PP; EVOH; biodegradable polymers like polyglycol acetate (PGAc), Polylactic acid (PLA); and copolymers and blends thereof.

The same polymer is considered in contact on either side of the interface between the inner and outer layers in the following cases:

inner and outer layers consist of the same material (e.g., $PET_{inner}$-$PET_{outer}$, regardless of the specific grade of each PET); or the inner and outer layers consist of a blend or copolymer having at least one polymer in common, provided said polymer in common is at the interface, whilst the differing polymer is substantially absent of said interface (e.g., $(0.85\ PET+0.15\ PA6)_{inner}$$(0.8\ PET+0.2\ PE)_{outer}$.

The presence of low amounts of additives is not regarded as departing from the scope of the present invention so far they do not alter the interface substantially.

The two layers (11) and (12) of the preform may be connected by an interface (14) throughout substantially the whole inner surface of the outer layer (cf. FIG. 1A). Inversely, they may be separated over a substantial area of the preform's body by a gap (14') containing air and which is in fluid communication with at least one interface vent (3) (cf. FIG. 1B). The latter embodiment is easier to realize when using a preform assembly designed such that the inner preform is firmly fixed to the outer preform at the neck region (6) and a substantial gap (14) may thus be formed between inner and outer layers (11) and (12).

The bag-in-container (2) of the present invention can be obtained by providing a preform as described above; bringing said preform to blow-moulding temperature; fixing the thus heated preform at the level of the neck region with fixing means in the blow-moulding tool; and blow-moulding the thus heated preform to form a bag-in-container. The inner and outer layers (21) and (22) of the thus obtained bag-in-container are connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, and on the pressure of the gas injected. The interfacial strength is of course a key issue and can be modulated by the choice of the material for the inner and outer layers, and by the process parameters during blow-moulding; the pressure-time-temperature window used is of course of prime importance and greatly depends on the material selected for the inner and outer layers.

Excellent results can be obtained if the blow-moulding process is carried out on a preform as described above, of the type wherein a gap containing air separates the inner and outer layers over a substantial area of the preform's body and wherein said gap is in fluid communication with at least one interface vent and wherein, in a first stage, a gas is blown into the space defined by the inner layer to stretch the preform, whilst the air in the gap separating the preform inner and outer layers is prevented from being evacuated by closing said at least one preform interface vent with a valve located in the fixing means; and in a second stage, when the air pressure building up in said gap reaches a preset value, the valve opens thus allowing evacuation of the air enclosed in the gap.

By this method, the inner layer is prevented from entering into contact with the outer layer by the air cushion enclosed within the gap separating the two layers when their respective temperatures are the highest. As stretching proceeds, the gap becomes thinner and air pressure within the gap increases. When the pressure reaches a preset value, the valve closing the vent opening releases, the air is ejected, and the inner layer is permitted to contact the outer layer and form an interface therewith at a stage where their respective temperatures have dropped to a level where adhesion between the layers cannot build up to any substantial level.

A release agent may be applied at the interface on either or both surfaces of the inner and outer preforms, which are to form the interface of the bag-in-container.

Any release agents available on the market and best adapted to the material used for the preform and resisting the blowing temperatures, like silicon- or PTFE-based release agents (e.g., Freekote) may be used. The release agent may be applied just prior to loading the preforms into the blowmoulding unit, or the preforms may be supplied pre-treated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

Additionally, application of the release agent allows a reduction of the width of the gap separating the inner and outer layers. By reducing the width of said gap, the inner layer of the preform can be designed with a same thickness but a larger radial cross section, resulting in a reduction of the stretch ratio of the inner layer during blow-moulding and hence a reducing potential formation of micro-cracks in the inner layer.

EXAMPLE

A preform according to the present invention was produced by injecting a melt into a first mould cavity to form the preform's inner layer (11). A melt was injected into a second mould cavity cooled to form the preform's outer layer (12). The two preform components were assembled to form a preform according to the present invention.

The preform produced as explained above was heated in an oven comprising an array of IR-lamps and then fixed into a blow-moulding mould which walls were maintained at a desired temperature. Air was blown into the preform under pressure. The thus produced bag-in-container was then filled with a liquid and connected to an appliance for dispensing beverage comprising a source of compressed air in order to determine the delamination pressure.

The delamination pressure was determined as follows. The interface vents of said bag-in-container were connected to the source of compressed air. Air was injected through the vents at a constant pressure and the interface between inner and outer layers was observed; the pressure was increased stepwise until delamination pressure was reached. Delamination pressure is defined as the pressure at which the inner bag separates from the outer layer over the whole of their interface and collapses. The surfaces of the thus separated layers were examined for traces of bonding.

The delamination pressure of the bag-in-container described above was of about 05±0.1 bar overpressure and showed little trace of cohesive fracture between the inner and outer layers. This example demonstrates that bag-in-containers of excellent quality can be produced with integral preforms according to the present invention.

The invention claimed is:

1. A two-layer integrally blow-moulded dispensing device comprising:
    an outer container consisting of a first single layer comprising PET having a neck region, a body portion, and a mouth;
    a collapsible inner bag consisting of a second single layer comprising PET, suitable for holding a liquid in said inner bag, wherein the outer container and the inner bag are adjacent, said inner bag in direct contact with the outer container forming an interface to which the outer container and said inner bag are releasably adhered;
    a vent between said inner bag and the outer container, said vent open to an outer atmosphere, wherein said vent is disposed at the neck region; and
    a source of pressurized gas removably attached to the vent.

2. The dispensing device of claim 1, wherein said mouth is in the neck region.

3. The dispensing device of claim 1, wherein the vent is one of a plurality of vents.

4. The dispensing device of claim 1, wherein the inner bag contains a liquid.

5. The dispensing device of claim 4, wherein the liquid is a beverage.

* * * * *